United States Patent
Sakib et al.

(10) Patent No.: US 10,268,816 B2
(45) Date of Patent: Apr. 23, 2019

(54) DYNAMIC UPDATING OF PROCESS POLICIES

(71) Applicant: Microsoft Technology Licensing, LLC, Redmond, WA (US)

(72) Inventors: Md. Nazmus Sakib, Seattle, WA (US); Yogesh Mehta, Redmond, WA (US); Kinshumann Kinshumann, Redmond, WA (US); Vishal Agarwal, Kirkland, WA (US); Giridharan Sridharan, Bellevue, WA (US); Arnold Paul Pereira, Bellevue, WA (US); Deskin Miller, Redmond, WA (US); Narendra Acharya, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 457 days.

(21) Appl. No.: 15/088,015

(22) Filed: Mar. 31, 2016

(65) Prior Publication Data
US 2017/0286664 A1 Oct. 5, 2017

(51) Int. Cl.
G06F 21/44 (2013.01)
G06F 21/45 (2013.01)
G06F 21/62 (2013.01)

(52) U.S. Cl.
CPC ............ G06F 21/44 (2013.01); G06F 21/45 (2013.01); G06F 21/62 (2013.01)

(58) Field of Classification Search
CPC ........... G06F 21/44; G06F 21/45; G06F 21/62
See application file for complete search history.

(56) References Cited

U.S. PATENT DOCUMENTS

| 8,429,741 B2 | 4/2013 | Pizano et al. |
| 2003/0182475 A1* | 9/2003 | Gimenez ............... G06F 21/10 710/8 |

(Continued)

FOREIGN PATENT DOCUMENTS

WO 2013030583 A1 3/2013

OTHER PUBLICATIONS

Liu et al. Dynamic Policy Scheme for Resource Allocation in Mobile IP Handoff, Aug. 2007, Third International Conference on Natural Computation, pp. 426-430 (Year: 2007).*

(Continued)

*Primary Examiner* — Kenneth W Chang
(74) *Attorney, Agent, or Firm* — Klarquist Sparkman, LLP

(57) ABSTRACT

A system for changing policy information of a process is provided. When a process is to execute, the system stores policy information for the process in association with the process code. The system also creates a token for the process. The token provides evidence of the policy for the process and includes at least a reference to the stored policy information. The system provides the token to the process for use by the process as evidence of the policy for the process. When the process provides the token to a service provider, the service provider uses the reference to access the policy information for the process. While the process is executing, the system modifies the stored policy information. When the process subsequently provides the token to a service provider, the service provider uses the reference to access the modified policy information for the process.

17 Claims, 8 Drawing Sheets

(56) References Cited

U.S. PATENT DOCUMENTS

| | | | |
|---|---|---|---|
| 2005/0251574 A1* | 11/2005 | Chagoly | G06F 11/3409 709/227 |
| 2006/0048226 A1 | 3/2006 | Rits et al. | |
| 2008/0218806 A1* | 9/2008 | Yokokura | H04N 1/00222 358/3.28 |
| 2009/0055888 A1* | 2/2009 | Little | H04L 63/20 726/1 |
| 2009/0205017 A1* | 8/2009 | Yabe | G06F 21/6209 726/1 |
| 2011/0271321 A1* | 11/2011 | Soppera | G06F 21/604 726/1 |
| 2011/0321147 A1* | 12/2011 | Chakra | G06F 21/6218 726/9 |
| 2014/0013452 A1 | 1/2014 | Aissi et al. | |
| 2014/0040977 A1* | 2/2014 | Barton | H04L 63/20 726/1 |
| 2014/0181186 A1* | 6/2014 | Stevens | H04L 67/322 709/203 |

OTHER PUBLICATIONS

"Create Global Objects," Published on: May 8, 2013 Available at: https://technet.microsoft.com/en-us/library/dn221972.aspx.

"Administering Oracle SOA Suite and Oracle Business Process Management Suite," Published on: Dec. 2015 Available at: https://docs.oracle.com/cloud/latest/soacs_gs/SOAAG/soa-infrastructure-configur.htm#SOAAG247.

"Using Software Restriction Policies to Protect Against Unauthorized Software," Published on: Oct. 2, 2006 Available at: https://technet.microsoft.com/en-us/library/cc507878.aspx.

"TokenAds," Published on: Jun. 15, 2012 Available at: http://www.tokenads.com/privacy.html.

"Modifying a live server configuration," Published on: May 30, 2009 Available at: https://openvpn.net/index.php/open-source/documentation/howto.html.

Colegrove, et al., "Group Security Policy Token v1," Published on: Jan. 2006 Available at: https://tools.ietf.org/html/draft-ietf-msec-policy-token-sec-06.

"About configuring the account for NetBackup Exchange operations with the right to Replace a process level token," Published on: Oct. 21, 2015 Available at: https://www.veritas.com/support/en_US/article.000071574.

* cited by examiner

DYNAMIC UPDATING OF PROCESS POLICIES

BACKGROUND

Devices, such as mobile phones, desktop computers, laptops, tablets, and so on, may have their security controlled by an organization to ensure that the devices comply with the policies of the organization. For example, a company may control the security of mobile phones that its employees use to conduct business to ensure that sensitive information of the organization is not compromised. An organization may employ a policy source (e.g., a program executing on a server) to manage the policies of the devices. The policy sources may include a mobile device management ("MDM") system, Microsoft's Group Policy, Microsoft's System Center Configuration Manager, messaging servers (e.g., to synchronize emails, contacts, calendars, tasks, and notes), and so on. When a device enrolls with a policy source, the policy source provides to the device policy information for controlling the device. The policy information may include, for example, password requirements (e.g., eight characters and at least one number and one letter), encryption requirements (e.g., encrypt all emails stored on the computing device), device lock requirements (e.g., lock device after 10 minutes of inactivity), email content requirements (e.g., add a legal notice to all emails), access control rights (e.g., administrator or user privilege), and so on. A program executing on a device ensures that the device operates in accordance with its policy information to ensure compliance with the policies of the organization.

The policies of some policy sources implement application locking and electronic data protection. With application locking, a programming executing on a device applies rules of a policy to determine whether an application can execute on the device. For example, a rule may specify that certain applications are prohibited from executing or that certain users are prohibited from running certain applications. With electronic data protection, a program executing on a device controls the data that the device can access. For example, an application provided by an organization may be allowed to access data of the organization, but no other application may be allowed to access the data of the organization.

When an application is to be executed, a process is created and control is passed to security code to set the security for the process based on the policy of the application. The security code, which may execute in a high privilege mode (e.g., kernel mode), retrieves the policy information for the application, creates a security token, and provides the security token to the process. The security token contains security information derived from the policy information and may be signed by the security code. When the process executing the application requests a service of a service provider (e.g., access to a file of a file system), the process provides the security token to the service provider as evidence of the policy information for the process. The service provider checks the security information of the security token to ensure that the requested service is allowed by the security information. If so, the service provider provides the service. If not, the service provider does not provide the service.

From time to time, the policy of an organization changes. For example, an organization may allow an application to access all the data of the organization regardless of the user who runs the application. The organization may, however, decide that access by some users should be restricted to only certain data of the organization. To implement such a change in policy, new policy information is distributed to the devices of the organization. The existing processes of the devices, however, have security tokens created based on the old policy information. To ensure that the current policy is being enforced on each device, the organization may require each device to be rebooted so that any process that has a security token based on the old policy information is terminated and any new process will have a security token based on the new policy information. The forcing of each device to reboot provides a less than optimal user experience. For example, a group of users may be in a collaboration session when their devices are rebooted. After each device is rebooted, the users would then need to rejoin a new collaboration session to continue where they left off before the rebooting.

SUMMARY

Methods and systems for allowing a security policy for a process of a device to be updated dynamically are provided. In some examples, prior to execution of the process, a policy update system stores policy information for the process. The policy update system may maintain a global policy information store that stores the policy information for each process. When a process is created to execute code, the policy update system retrieves policy information for the process. The policy update system adds an entry for the process to the policy information store. The policy update system creates a token for the process that may include a reference to the stored policy information. When the process provides the token to a service provider as evidence of the policy for the process, the service provider uses the reference to access the policy information for the process stored in the policy information store. The service provider then decides whether to allow the requested service based on the policy information for the process. While the process is executing, the device may receive a notification of a change in the policy information for the device. The policy update system then modifies the policy information for the process that is stored in the policy information store. When the process provides the token to a service provider after the policy information has been modified, the reference is useable by the service provider to access the modified policy information for the process stored in the policy information store. The service provider can then decide whether to allow the requested service based on the modified policy information for the process.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
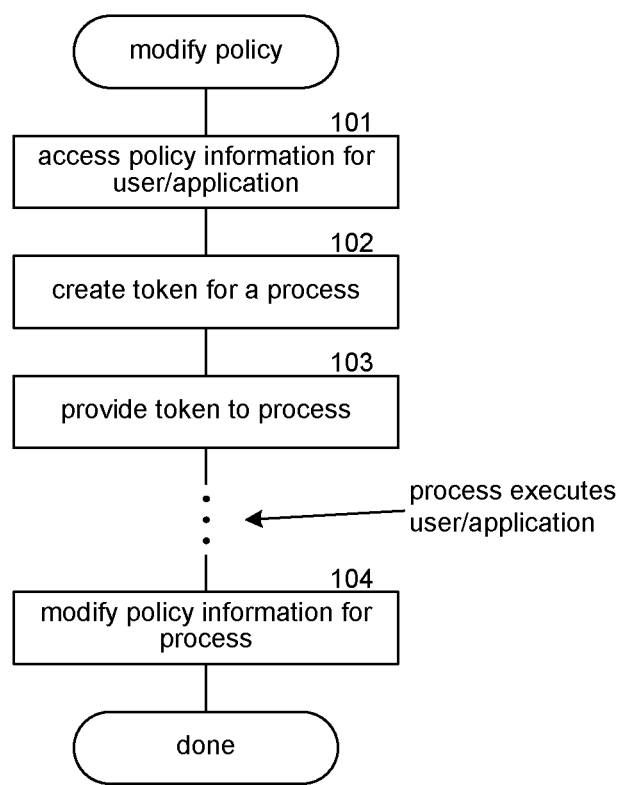
FIG. 1 is a flow diagram that illustrates the modifying of a policy by a policy update system in some examples.

Methods and systems for allowing a security policy for a process of a device to be updated dynamically without having to reboot the device or otherwise restart the process are provided. In some examples, prior to execution of a process that is to execute code (e.g., an application), a policy update system stores policy information for the process. For example, the policy update system may store the policy information during creation of the process or after creation of the process but before execution of the process starts. The policy information indicates the policy that should be enforced for the process. The policy update system may maintain a global policy information store that stores the policy information for each process and that is accessible only in a high privilege mode. For example, the policy information store may be a table that has, for each process, an entry that contains the policy information for the process. When a process is created to execute code, the policy update system retrieves policy information for the process. The policy information for a process may be based on the code that the process is to execute, the user on whose behalf the process executes, and so on. The policy update system adds an entry for the process to the policy information store. For example, the policy information may indicate that an application, when executed on behalf of a certain user, is authorized to access only certain files. The policy update system then creates a token for the process. The token may include a reference to the stored policy information. For example, the reference may be an index of the entry in a policy information table that stores the policy information for the process. Alternatively, the security token may include not a reference but rather a process identifier assigned by an operating system when a process is created that can be used to locate the entry in the policy information store. The policy update system then provides the token to the process for use by the process as evidence of the policy for the process. When the process provides the token to a service provider as evidence of the policy for the process, the service provider uses the reference to access the policy information for the process stored in the policy information store. The service provider then decides whether to allow the requested service based on the policy information for the process. For example, if the requested service is to access a file of a file system, the file system may determine that the process is allowed access to the file.

While the process is executing, the device may receive a notification of a change in the policy information for the device. The policy update system then modifies the policy information for the process that is stored in the policy information store. For example, the modified policy information may indicate that the process no longer has access to a file to which it previously had access. When the process subsequently provides the token to a service provider, the service provider uses the reference to access the modified policy information for the process stored in the policy information store. The service provider then decides whether to allow the requested service based on the modified policy information for the process. For example, if the requested service is to access the same file to which it previously had access, the file system would determine that the process is not allowed access to the file. In this way, the policy update system modifies the policy information for a process, and the modified policy information is effective without having to reboot the device or otherwise terminate and recreate the process.

In some examples, a device may be booted with the enforcement of policy information disabled. In such a case, the policy update system may add an entry to the policy information store for each process and provide a token to each process. The entries, however, need not include any policy information. Each entry may include a token reference count and a service provider reference count. The token reference count for a process indicates the number of copies of the token that currently exist. When a token is created, the token reference count is set to one. When the token is copied, the token reference count is incremented. When a token (i.e., the originally created token or a copy) is destroyed, the token reference count is decremented. The service provider reference count indicates the number of service providers that are currently using a token. When the token reference count and the service provider reference count are both zero, the policy update system may remove the entry for the corresponding process from the policy information store.

In some examples, when the device is booted with enforcement disabled, the policy update system sets a flag indicating that enforcement is disabled. When a service provider is provided a token, the service provider can check the flag to determine whether it needs to retrieve the policy information from the policy information store. If the enforcement is disabled, the service provider does not need to access the policy information store to retrieve the policy information. In such a case, the policy update system may locate the policy information store in paged memory of the device because the policy information store is accessed only for actions that are not time-critical such as adding and deleting an entry or updating a reference count. If the enforcement is enabled when the device is booted, the policy update system locates the policy information store in non-paged memory because access to the policy information may be time-critical. For example, an interrupt routine executing on behalf of a service provider may need to take some action in real time, and the swapping in of the policy information store may take too long to allow the action to be taken in a timely manner.

In some examples, if the device is booted with enforcement disabled and then enforcement is enabled, the policy update system may then relocate the policy information from paged memory to non-paged memory and add the policy information for each process to the policy information store. The policy update system may lock the policy information store that is in paged memory to prevent the applications and service providers from updating the policy information store and then copy the policy information store to non-paged memory. The policy update system may then, for each process, retrieve the policy information for the process, retrieve the token for the process, and use the reference in the token to store the policy information in the entry for the process in the policy information store that is in non-paged memory. The policy update system then sets the flag to indicate that enforcement is enabled and unlocks the policy information store that is in paged memory. All subsequent accesses to the policy information store are directed to the policy information store in non-paged memory. In addition, because the policy information store is located in non-paged memory, an interrupt routine can access the policy information store without the overhead of swapping in a page of memory.

In some examples, the dynamic updating of policy information can be performed even when policy information is stored in a token. In such a case, a policy update system can require that a process retrieve the token from a policy update system each time a token is needed. For example, before a process is to access a file, the process requests the policy update system to provide a token. The token contains the current policy information for the process. If the policy information for the process changes, then the next time the process requests a token, the policy update system will provide a token with the updated policy information. To prevent a process from reusing a token and from delaying the use of a token, the policy update system may disable a token after it is used by a service provider and may set a short time-to-live attribute of the token. If a service provider is provided a token that is disabled or that has passed its time to live, the service provider does not allow the requested service. As an alternative to requiring that a process retrieve a token each time a service is to be requested, a policy update system may track each token (e.g., copies). When policy information is modified, the policy update system may suspend each process, update the tokens with the new policy information, and resume each process.

FIG. 1 is a flow diagram that illustrates the modifying of a policy by a policy update system in some examples. The policy update system may be invoked when a process is created by an operating system for execution of an application. In block 101, the policy update system accesses policy information for the application, the user, the device, and so on. The policy update system then adds an entry to a policy information store to store the policy information for the process. In block 102, the policy update system creates a token for the process that may include a reference to the entry in the policy information store. In block 103, the policy update system then provides the token to the process. The process executes the code of the application and uses the token to request services of a service provider. The service provider uses the reference provided by the token to access policy information for the process. Subsequently, the policy information for the application or user may be changed. In block 104, the policy update system modifies policy information for the process that is stored in the policy information store. When a service provider then uses the reference provided by the token to access policy information for the process, the modified policy information is accessed.

Figure 2:
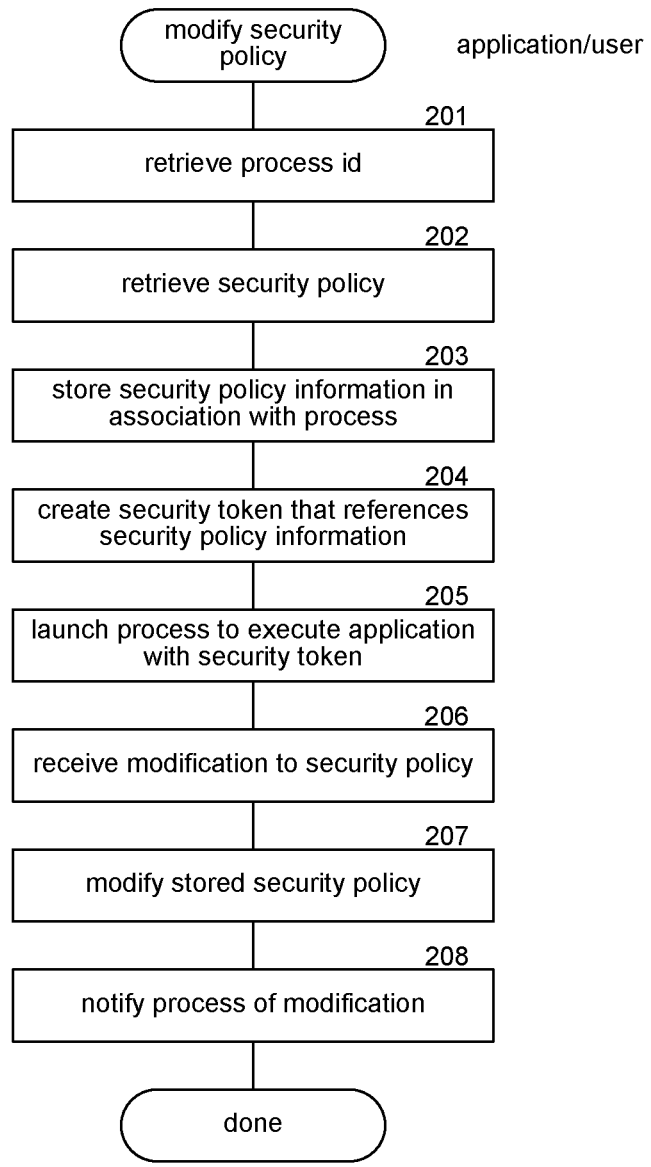
FIG. 2 is a flow diagram that illustrates the processing of a modify security policy component of a policy update system in some examples.

FIG. 2 is a flow diagram that illustrates the processing of a modify security policy component of a policy update system in some examples. A modify security policy component 200 may be initially provided with identification of an application and a user. In block 201, the component retrieves a process identifier for the process that is to execute the application. In block 202, the component retrieves a security policy for the application and the user. In block 203, the component stores security policy information in association with the process in a policy information store. In block 204, the component creates a security token that references the security policy information for the process. In block 205, the component launches the process to execute the application using the security token. In block 206, at a later time, the component receives a modification to the security policy for the application and/or the user. In block 207, the component modifies the security policy information for the process that is stored in the policy information store based on the modification to the security policy. In block 208, the component notifies the process or service providers of the modification and then completes.

Figure 3:
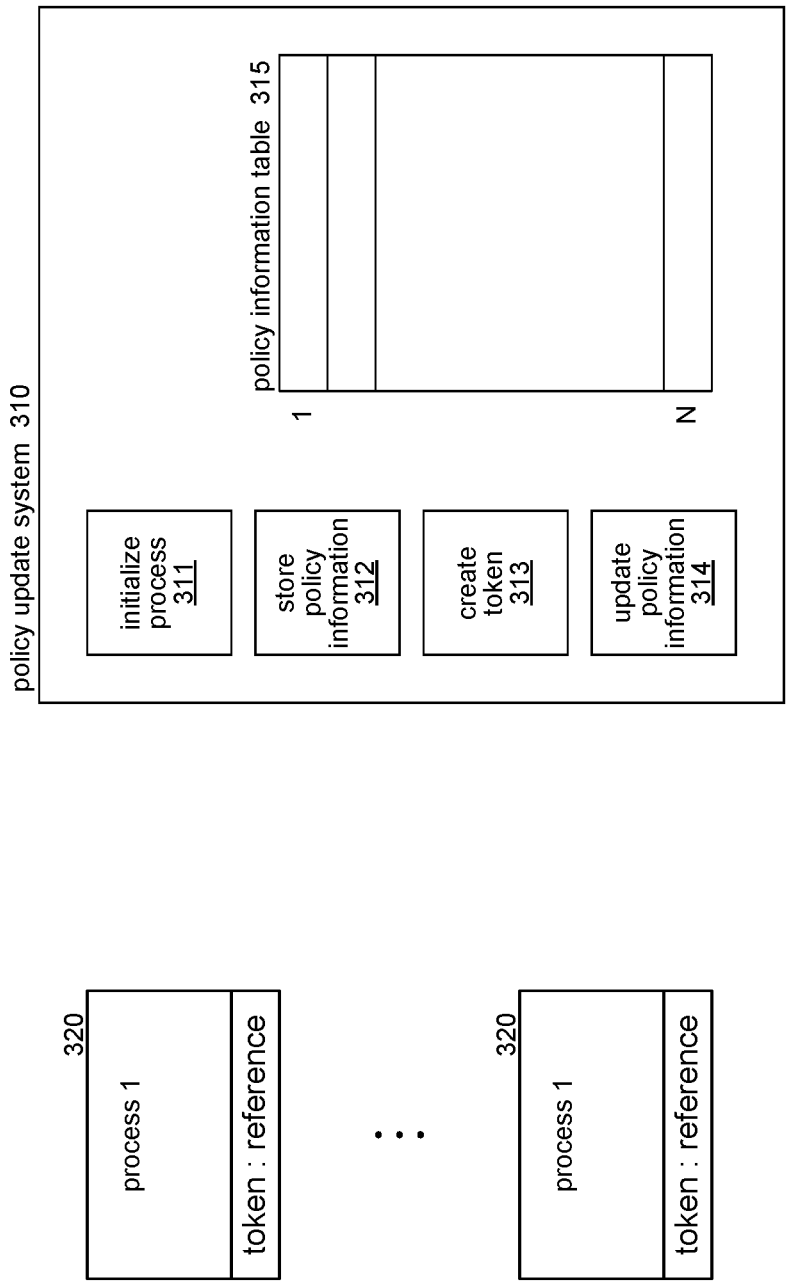
FIG. 3 is a block diagram that illustrates components of a policy update system in some examples.

FIG. 3 is a block diagram that illustrates components of a policy update system in some examples. A policy update system 310 may include an initialize process component 311, a store policy information component 312, a create token component 313, and an update policy information component 314. The policy update system may also include a policy information table 315. The initialize process component may be invoked by an operating system during the creation of a process. The initialize process component may invoke the store policy information component to store policy information for the process in the policy information table. The initialize process component may also invoke the create token component to create the token for the process that includes a reference to an entry in the policy information table. The update policy information component is invoked when policy information for an application and/or a user is updated. Processes 320 are created by the operating system to execute applications. Each process includes a token that can provide a reference to the entry for that process in the policy information table.

The computing systems (e.g., devices) on which the policy update system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include desktop computers, laptops, tablets, e-readers, personal digital assistants, smartphones, gaming devices, servers, point-of-sale terminals, and so on. The computing systems may also include servers of a data center, massively parallel systems, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on it or may be encoded with computer-executable instructions or logic that implements the policy update system. The data transmission media is used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys.

The policy update system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules and components may be combined or distributed as desired in various examples. Aspects of the policy update system may be implemented in hardware using, for example, an application-specific integrated circuit ("ASIC").

Figure 4:
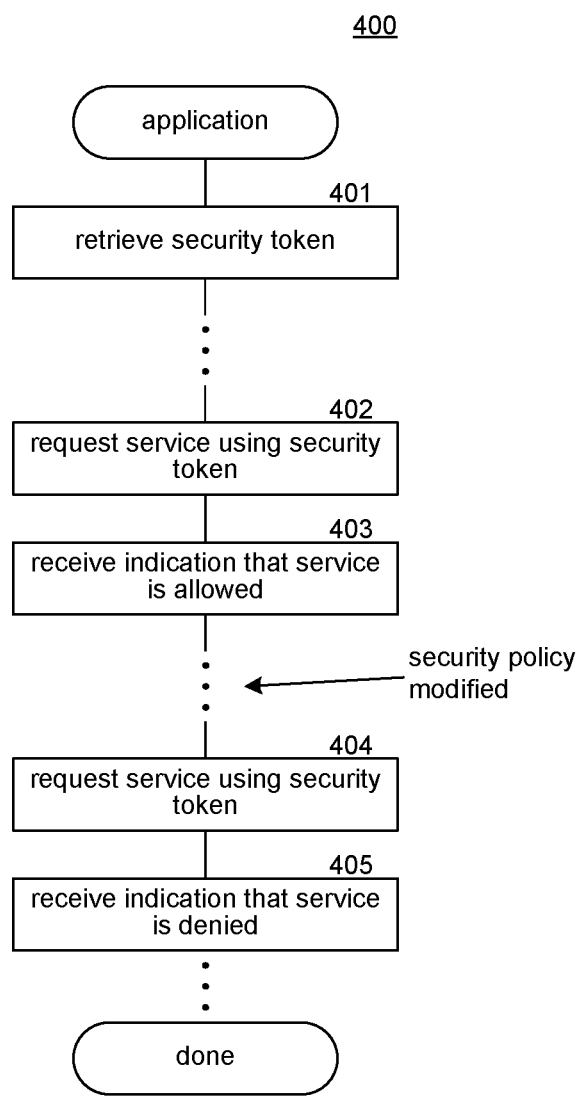
FIG. 4 is a flow diagram that illustrates the processing of an application that uses a security policy that has been modified in some examples.

FIG. 4 is a flow diagram that illustrates the processing of an application that uses a security policy that has been modified in some examples. An application 400 that is executed by a process is provided with a security token and uses the security token to request services of a service provider both before and after its security policy is modified. In block 401, the application retrieves the security token for the process that is provided by the policy update system. In block 402, the application requests a service of a service provider and provides the security token to the service provider. The service provider uses the security token to determine whether to allow the requested service. In block 403, the component receives an indication that the service is allowed by the service provider. The policy update system may then modify the security policy for the process. In block 404, after the security policy has been modified, the application requests the same service from the same service provider and provides the same security token to the service provider. The service provider uses the security token to determine whether to allow the requested service. In this case, the modification to the security policy now indicates that the requested service should not be allowed. In block 405, the application receives an indication from the service provider that the service is not allowed. The application eventually completes.

Figure 5:
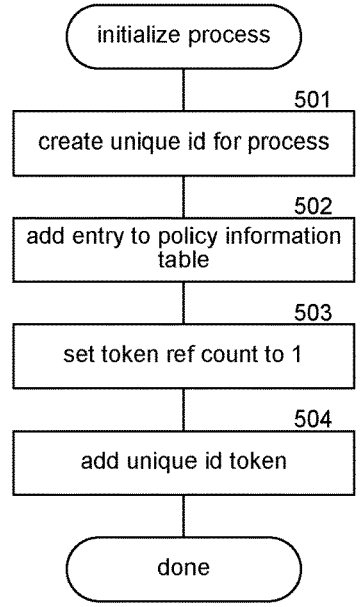
FIG. 5 is a flow diagram that illustrates the processing of an initialize process component of a policy update system in some examples.

FIG. 5 is a flow diagram that illustrates the processing of an initialize process component of a policy update system in some examples. When a process is created by an operating system, an initialize process component 500 is invoked to create a security token for the process. In block 501, the component creates a unique identifier for the process. In block 502, the component adds an entry to the policy information table for the process. The component may set a flag to indicate whether policy enforcement is enabled or disabled. If enforcement is disabled, then the component does not add any policy information to the entry. If enforcement is enabled, then the component adds policy information for the process to the entry. In block 503, the component creates a token and sets its token reference count to one. In block 504, the component adds the unique identifier of the process to the token and provides the token to the process and then completes.

Figure 6:
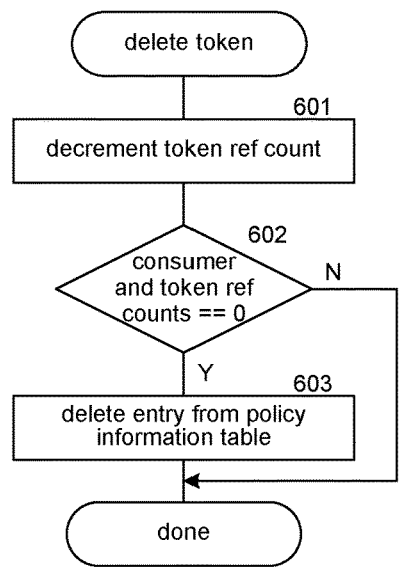
FIG. 6 is a flow diagram that illustrates the processing of a delete token component of a policy update system in some examples.

FIG. 6 is a flow diagram that illustrates the processing of a delete token component of a policy update system in some examples. A delete token component 600 is invoked when a process deletes a token. In block 601, the component decrements the token reference count for the process identified by the token that is to be deleted. In decision block 602, if the consumer reference count and token reference count are both zero, then the component continues at block 603, else the component completes. In block 603, the component deletes the entry for the process from the policy information table and then completes. Although not illustrated, the policy update system may also include a copy token component that creates a copy of the token and increments the corresponding token reference count in the policy information table.

Figure 7:
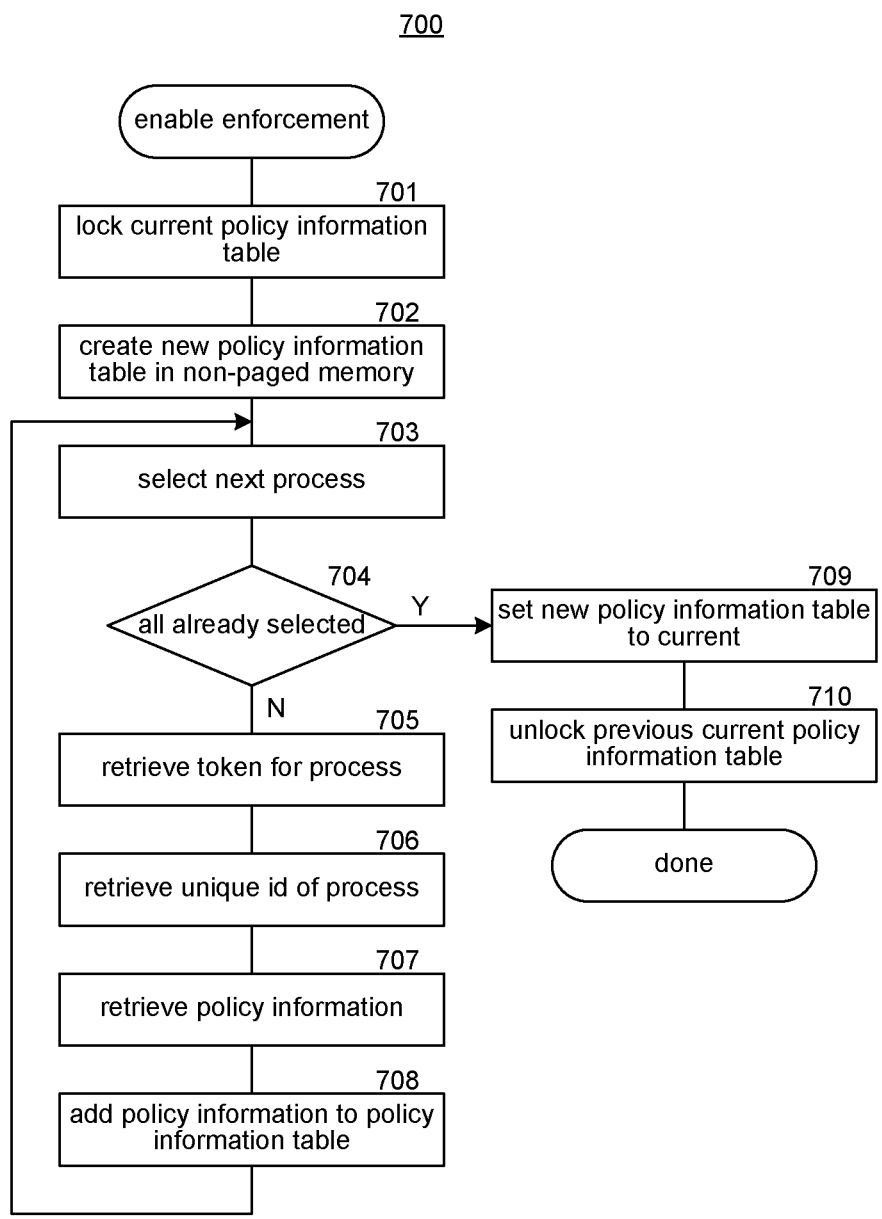
FIG. 7 is a flow diagram that illustrates the processing of an enable enforcement component of a policy update system in some embodiments.

FIG. 7 is a flow diagram that illustrates the processing of an enable enforcement component of a policy update system in some embodiments. An enable enforcement component 700 is invoked when enforcement of the policy is switched from disabled to enabled. In block 701, the component locks the current policy information table so that no processes can access the table. In block 702, the component creates a new policy information table that is located in non-paged memory. When a device is initially booted with enforcement disabled, the policy information table is located in paged memory. The new policy information table may be a copy of the current policy information table. In blocks 703-708, the component loops updating the policy information for each process. In block 703, the component selects a process. In decision block 704, if all the processes have already been selected, then the component continues at block 709, else the component continues at block 705. In block 705, the component retrieves the token for the selected process. In block 706, the component retrieves the unique identifier of the process from the token. In block 707, the component retrieves policy information (e.g., based on the application or user) for the process. In block 708, the component adds the policy information to the policy information table and then loops to block 703 to select another process. In block 709, the component sets the new policy information table to be the current policy information table and sets a flag to indicate that enforcement is enabled. In block 710, the component unlocks the previous current policy information table so that the processes can continue processing with the new policy information table, which is now the current policy information table. The component then completes.

Figure 8:
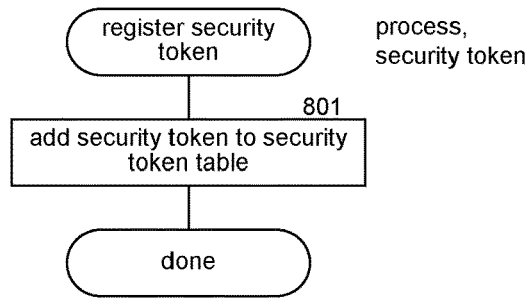
FIG. 8 is a flow diagram that illustrates the processing of a component invoked when an application creates a copy of a security token in some examples.
Figure 9:
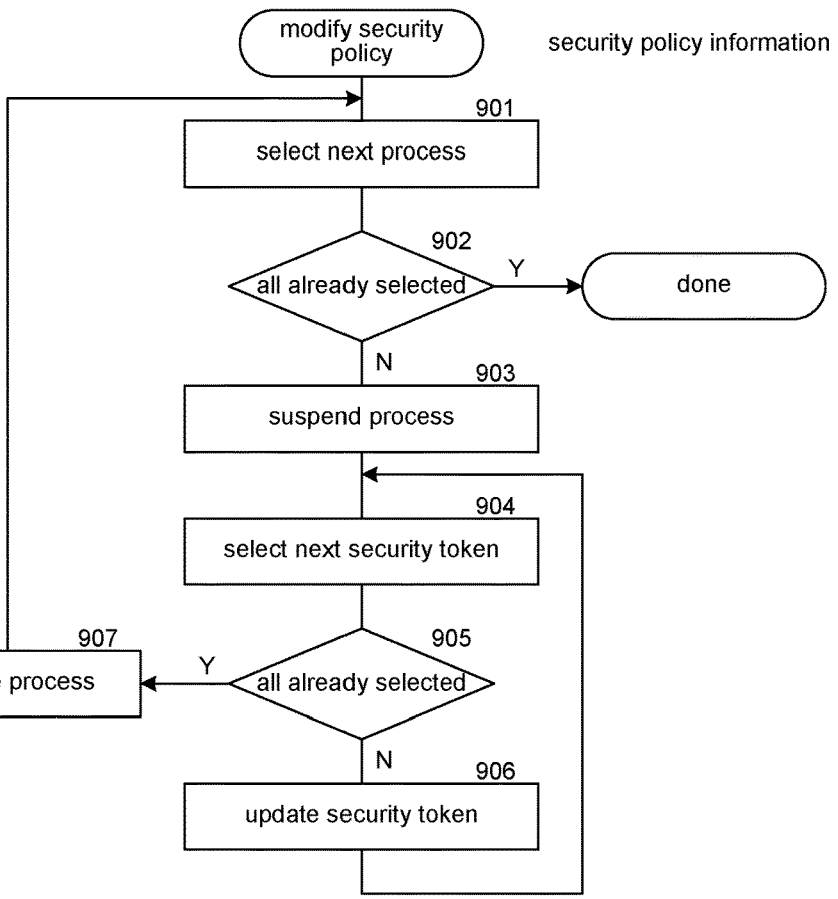
FIG. 9 is a flow diagram that illustrates the processing of a component that is invoked to modify a security policy in some examples.

FIGS. 8 and 9 are flow diagrams that illustrate the processing of components that support storing policy information in a token. FIG. 8 is a flow diagram that illustrates the processing of a component that is invoked when an application creates a copy of a security token in some examples. A register security token component 800 is passed an indication of the process and a security token that has been copied. In block 801, the component adds a reference to the security token to a security token table in association with the process and then completes.

FIG. 9 is a flow diagram that illustrates the processing of a component that is invoked to modify a security policy in some examples. A modify security policy component 900 is invoked when security policy information is modified. In block 901, the component selects the next process. In decision block 902, if all the processes have already been selected, then the component completes, else the component continues at block 903. In block 903, the component suspends the selected process. In blocks 904-906, the component loops updating each security token of the selected process. In block 904, the component selects a security token. In decision block 905, if all the security tokens for the selected process have already been selected, then the component continues at block 907, else the component continues at block 906. In block 906, the component updates the security token with the new policy information and then loops to block 904 to select another security token. In block 907, the component resumes the suspended process and loops to block 901 to select the next process.

Figure 10:
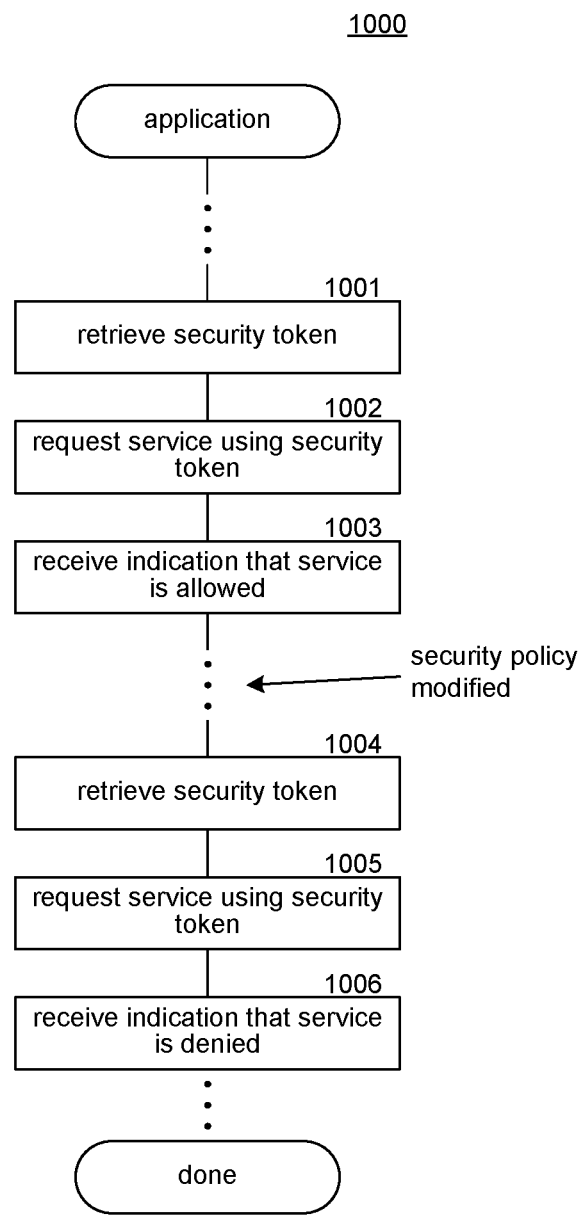
FIG. 10 is a flow diagram that illustrates the processing of an application that retrieves a security token each time a service is to be requested in some examples.

FIG. 10 is a flow diagram that illustrates the processing of an application that retrieves a security token each time a service is to be requested in some examples. An application 1000, which is executed by a process, is developed to retrieve a security token each time a service is to be requested. In block 1001, the application retrieves a security token for the process. In block 1002, the application requests the service of a service provider using the security token. In block 1003, the application receives an indication that the service is allowed. The security policy is then modified so that process is no longer allowed to have the service performed on its behalf. In block 1004, the application retrieves the security token again. In block 1005, the application requests the same service of the same service provider using the recently retrieved security token. In block 1006, the application now receives an indication that the service is not allowed because of the modification to the security policy that is reflected in the newly retrieved token.

The following paragraphs describe various examples of aspects of the collaboration system. An implementation of a policy update system may employ any combination of the examples. The processing described below may be performed by a computing device with a processor that executes computer-executable instructions stored on a computer-readable storage medium that implements the policy update system.

In some examples, a method performed by a computing device for changing policy information of a process is provided. Prior to execution of the process, the method stores policy information for the process. The method also creates a token for the process. The token provides evidence of the policy information for the process and includes at least one reference to the stored policy information. The method then provides the token to the process for use by the process as evidence of the policy information for the process. While the process is executing, the method modifies the stored policy information so that when the process provides the token to a service provider after the stored policy information has been modified, the reference included in the token is usable by the service provider to access the modified policy information for the process. In some examples, the policy information is stored in a data structure that includes policy information for multiple processes. In some examples, the reference is a unique identifier of a portion of the data structure that stores the policy information for the process. In some examples, the unique identifier is an identifier of the token. In some examples, the the policy information is located in non-paged memory. In some examples, the method further comprises locating the policy information in paged memory when policy protection is disabled and relocating the policy information to non-paged memory when policy protection is subsequently enabled. In some examples, the method further comprises notifying the process when the policy information has been modified. In some examples, the policy information indicates access rights of a user. In some examples, the policy information indicates a capability of code executed by the process. In some examples, the policy information indicates security context for the process.

In some example, a computing device for dynamically changing policies during execution of applications is provided. The device comprises at least one processor and a computer-readable storage medium. The computer-readable storage medium stores for each of the applications, policy information for a process that executes the application in association with the process. The policy information for the process is derived from policy information for the application. The computer-readable storage medium stores computer-executable instructions that, based on execution by the at least one processor, configure the processor to, for each process that executes one of the applications create a token for the process that is to execute the application. The token includes a reference to the stored policy information for the process. The instructions further configure the processor to provide the token to the process. The process is configured to provide the token to a service provider. The instructions further configure the processor to while the process is executing the application, modify the stored policy information so that when the process provides the token to the service provider after the policy information has been modified, the reference included in the token is usable by the service provider to access the modified policy information for the process. In some examples, a reference is a unique identifier of a portion of a data structure that stores the policy information for a process. In some examples, the unique identifier is an identifier of the token. In some examples, a process makes multiple copies of the token and each copy of the token includes the reference to the policy information for the process. In some examples, the computer-executable instructions further include instructions that configure the process to prior to modifying the stored policy information, request a copy of the token and retrieve the reference from the copy of the token. In some examples, the policy information is located in non-paged memory of the computer-readable storage medium. In some examples, the computer-executable instructions further include instructions that configure the processor to notify the process when the policy information has been modified.

In some examples, one or more computer-readable storage media storing computer-executable instructions that based on execution by a computing device cause the computing device to dynamically modify a security policy during execution of an application is provided. The instructions cause the computing device to store security policy information for a process that executes the application. The security policy information is derived from the security policy for the application. The instructions further cause the computing device to provide a security token to the process. The security token is associated with reference information for the security policy information. The instructions further cause the computing device to while the process is executing, modify the stored security policy information so that when the process subsequently provides the security token to a service provider, the reference information that the security token is associated with is usable by the service provider to access the modified security policy information for the application. In some examples, the reference information uniquely identifies a portion of a data structure that stores the security policy information for the process, and wherein the data structure stores security policy information for multiple processes. In some examples, the data structure is located in non-paged memory.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method performed by a computing device for changing policy information of a process, the method comprising:
   prior to execution of the process,
      storing policy information for the process;
      creating a token for the process, the token providing evidence of the policy information for the process and including at least one reference to the stored policy information; and providing the token to the process for use by the process as evidence of the policy information for the process;

while the process is executing, modifying the stored policy information so that when the process provides the token to a service provider after the stored policy information has been modified, the reference included in the token is usable by the service provider to access the modified policy information for the process; and locating the policy information in paged memory when policy protection is disabled and relocating the policy information to non-paged memory when policy protection is subsequently enabled.

2. The method of claim 1 wherein the policy information is stored in a data structure that includes policy information for multiple processes.

3. The method of claim 2 wherein the reference is a unique identifier of a portion of the data structure that stores the policy information for the process.

4. The method of claim 3 wherein the unique identifier is an identifier of the token.

5. The method of claim 1 further comprising notifying the process when the policy information has been modified.

6. The method of claim 1 wherein the policy information indicates access rights of a user.

7. The method of claim 1 wherein the policy information indicates a capability of code executed by the process.

8. The method of claim 1 wherein the policy information indicates security context for the process.

9. A computing device for dynamically changing policies during execution of applications, the device comprising:

at least one processor; and a computer-readable storage medium storing:

for each of the applications, policy information for a process that executes the application in association with the process, the policy information for the process derived from policy information for the application; and computer-executable instructions that, based on execution by the at least one processor, configure the processor to, for each process that executes one of the applications:

create a token for the process that is to execute the application, the token including a reference to the stored policy information for the process;

provide the token to the process, the process configured to provide the token to a service provider;

while the process is executing the application, modify the stored policy information so that when the process provides the token to the service provider after the policy information has been modified, the reference included in the token is usable by the service provider to access the modified policy information for the process; and locating the policy information in paged memory when policy protection is disabled and relocating the policy information to non-paged memory when policy protection is subsequently enabled.

10. The computing device of claim 9 wherein a reference is a unique identifier of a portion of a data structure that stores the policy information for a process.

11. The computing device of claim 10 wherein the unique identifier is an identifier of the token.

12. The computing device of claim 9 wherein a process makes multiple copies of the token and each copy of the token includes the reference to the policy information for the process.

13. The computing device of claim 9 wherein the computer-executable instructions further include instructions that, prior to modifying the stored policy information, request a copy of the token and retrieve the reference from the copy of the token.

14. The computing device of claim 9 wherein the computer-executable instructions further include instructions that notify the process when the policy information has been modified.

15. One or more computer-readable storage media storing computer-executable instructions that based on execution by a computing device cause the computing device to dynamically modify a security policy during execution of an application by causing the computing device to:

store security policy information for a process that executes the application, the security policy information derived from the security policy for the application;

provide a security token to the process, the security token associated with reference information for the security policy information;

while the process is executing, modify the stored security policy information so that when the process subsequently provides the security token to a service provider, the reference information that the security token is associated with is usable by the service provider to access the modified security policy information for the application; and locating the policy information in paged memory when policy protection is disabled and relocating the policy information to non-paged memory when policy protection is subsequently enabled.

16. The one or more computer-readable storage media of claim 15 wherein the reference information uniquely identifies a portion of a data structure that stores the security policy information for the process, and wherein the data structure stores security policy information for multiple processes.

17. The one or more computer-readable storage media of claim 16 wherein the data structure is located in non-paged memory when policy protection is enabled.

* * * * *